United States Patent
Hildesson et al.

(10) Patent No.: US 6,375,334 B1
(45) Date of Patent: Apr. 23, 2002

(54) REAR-VIEW MIRROR FOR A VEHICLE

(75) Inventors: Mikael Hildesson, Romelanda; Dan Frykholm, Gothenburg, both of (SE)

(73) Assignee: AB Volvo, Gothenburg (SE)

(*) Notice: Subject to any disclaimer, the term of this patent is extended or adjusted under 35 U.S.C. 154(b) by 0 days.

(21) Appl. No.: 09/857,442

(22) PCT Filed: Nov. 23, 1999

(86) PCT No.: PCT/SE99/02161

§ 371 Date: Aug. 21, 2001

§ 102(e) Date: Aug. 21, 2001

(87) PCT Pub. No.: WO00/34077

PCT Pub. Date: Jun. 15, 2000

(30) Foreign Application Priority Data

Dec. 4, 1998 (SE) .............................................. 9804222

(51) Int. Cl.[7] .............................................. G02B 7/182
(52) U.S. Cl. .................... 359/872; 359/881; 248/475.1; 248/486; 296/146.11
(58) Field of Search ................................ 359/841, 844, 359/864, 871, 872, 875, 881; 248/475.1, 476, 479, 486; 296/146.11

(56) References Cited

U.S. PATENT DOCUMENTS

| 2,596,632 A | | 5/1952 | Whitehead |
| 4,818,088 A | * | 4/1989 | Sacknoff .................. 296/96.21 |
| 5,516,073 A | * | 5/1996 | McMahan .................. 248/486 |

FOREIGN PATENT DOCUMENTS

| DE | 40 11 787 | 10/1991 |
| EP | 0 190 715 | 8/1986 |
| EP | 0 786 379 | 7/1997 |

* cited by examiner

Primary Examiner—Mark A. Robinson
(74) Attorney, Agent, or Firm—Young & Thompson

(57) ABSTRACT

A rear-view mirror for a vehicle, especially for lorries, includes a mirror housing in which at least one mirror glass is arranged and an upper arm, a first end of which is connected to the mirror housing and a second end of which is connected to a door of the vehicle. A lower arm, a first end of which is connected to the mirror housing and a second end of which is connected to the door in an area located below the level at which a lower edge of a side window of the door is located, where the second end of the upper arm is connected to a hinge which connects the door to the bodywork of the vehicle.

6 Claims, 1 Drawing Sheet

REAR-VIEW MIRROR FOR A VEHICLE

FIELD OF THE INVENTION

The present invention concerns a rear-view mirror for a vehicle, especially for lorries, comprising a mirror housing in which at least one mirror glass is arranged and an upper arm, a first end of which is connected to the mirror housing and a second end of which is connected to a door of the vehicle.

BACKGROUND OF THE INVENTION

On a vehicle, like a lorry, rear-view mirrors are arranged on both sides of the driver's cab, so that the driver can observe what is happening behind and along the sides of the vehicle. Such rear-view mirrors are also called side mirrors. Rear-view mirrors are preferably so arranged on the driver,s cab that the driver can see each mirror through the side window of the door of the driver's cab respectively. In order for the rear-view mirrors to be capable of adjustment for drivers of different heights, the glass of the mirror is adjusted, so that it can be tilted to different angles relative to the driver's cab and hence the driver.

Since the rear-view mirrors are arranged on the outside of the vehicle, attention must be paid to the effects which the airflow has. Thus, the rear-view mirrors must be made stable and aerodynamic so that vibration and wind noise and squeaking sounds are minimized. The shape of the rear-view mirrors must also minimize dirt from the surroundings and from the vehicle in front getting caught on the side windows of the doors.

A rear-view mirror for vehicles currently used comprises a mirror housing in which a mirror glass is arranged. The mirror housing is connected via an upper arm and a lower arm with a hinge to the vehicle door at or below a level at which the lower edge of a side window of a door is located. There is the desire to minimize vibrations and wind noise from the known rear-view mirror and to change the dirt situation so that less dirt is deposited on the windows of the doors.

SUMMARY OF THE INVENTION

Thus, it is an object of the present invention to achieve a rear-view mirror for vehicles which minimizes the occurence of vibrations and wind noise and minimizes the occurence of dirt deposition on the side windows of the vehicle.

This is achieved by means of a rear-view mirror of the type presented in the introduction which comprises a lower arm, a first end of which is connected to the mirror housing and a second end of which is connected to the door in an area located below a level at which the lower edge of the side window of the door is located, where the second end of the upper arm is connected to a hinge, which connects the door to the bodywork of the vehicle.

Such a rear-view mirror is very stable and gives rise to little or no vibration in the rear-view mirror. It has been found that vibrations of a rear-view mirror give rise to a blurred image in the mirror. The stable construction of the rear-view mirror according to the present invention means that the driver can see clearly in the rear-view mirror what is happening behind and along the sides of the vehicle. Since the lower arm is connected to the door in an area located below the level at which the lower edge of the side window of the door is located, dirt and dust, which are directed by the lower arm, can be deflected away from the side window so that less dirt is deposited on it. By making the upper arm, the lower arm and the mirror housing as a single item as indicated in claim 4, slits and gaps, which can give rise to wind noise and squeaking sounds, are avoided.

BRIEF DESCRIPTION OF THE DRAWING

The invention is more precisely described in the following by means of the appended drawings showing an example of an embodiment, in which.

DETAILED DESCRIPTION OF THE INVENTION

Figure 2:
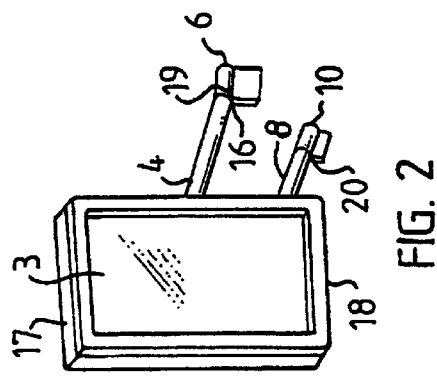
Figure 1:
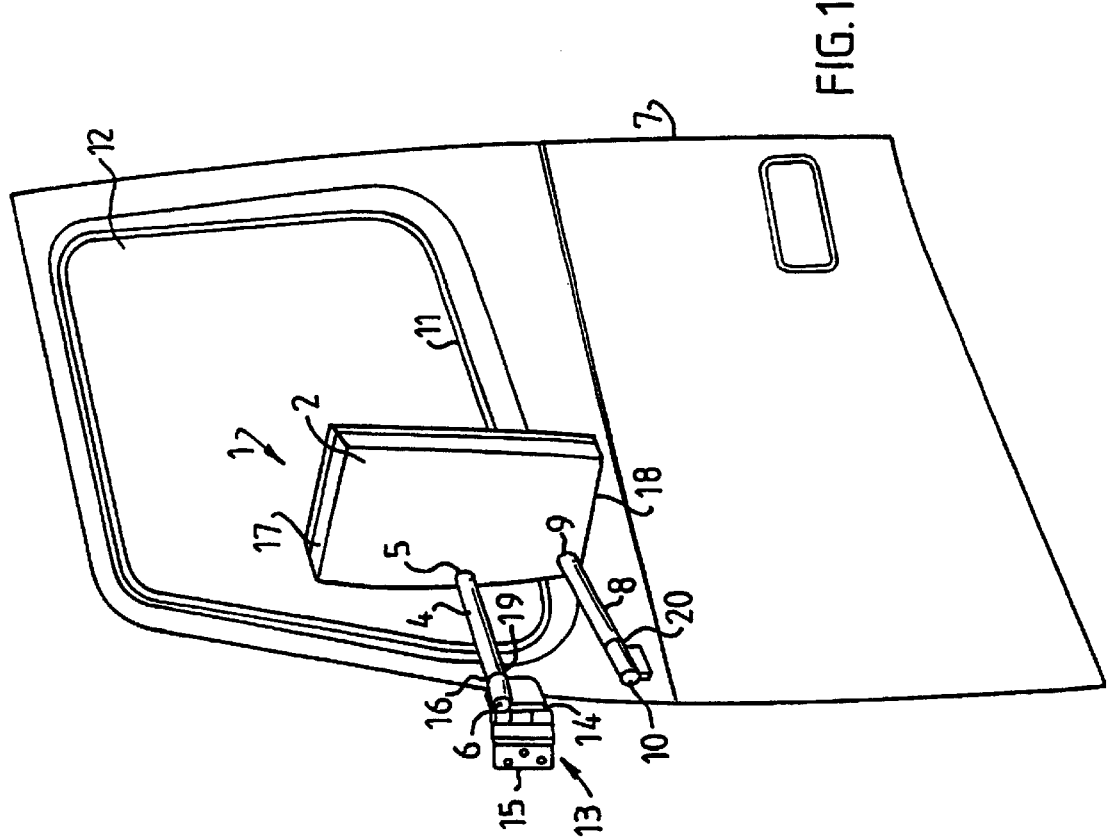
FIG. 1. shows a perspective view of the rear of a rear-view mirror according to the present invention, and FIG. 2. shows a perspective view of the front of the rear-view mirror according to FIG. 1.

In FIGS. 1 and 2, two different perspective views of a rear-view mirror 1 according to the present invention are shown. The rear-view mirror 1 comprises a mirror housing 2 in which at least one mirror glass 3 is arranged. An upper arm 4 is with a first end 5 connected to the mirror housing 2, and with a second end 6 connected to a hinge 13 with the door 7 of a vehicle. A lower arm 8 is with a first end 9 connected to the mirror housing 2, and with a second end 10 connected to the door 7 in an area located below the level at which the lower edge 11 of the side window 12 of door 7 is located. In this way, dust and dirt from the surroundings and/or from a vehicle in front are prevented from being deposited on the side window 12 of the door 7. The reason being that behind the arms 4,8, a negative pressure is formed, which directs the airflow and particles therein in a predetermined direction. By connecting the lower arm 8 to the door 7 in an area located below the level at which the lower edge 11 of the side window 12 of the door 7 is located, the particles in the airflow are directed to an area beneath the side window 12.

The door 7 is in a conventional way jointed to the vehicle by means of hinge 13. The second end 6 of the lower arm 4 is connected to the hinge 13. A hinge 13 usually comprises two parts 14,15 which are jointed to each other. Thus, one of the parts 14 is firmly connected to the door 7 and the second part is firmly connected to the bodywork of the vehicle. The second end 6 of the upper arm 4 is connected to 7 is connected to the part 14 of the hinge 13 which is firmly connected to the door 7.

During assembly of the door 7, a displacement of the hinge 13 relative to the door 7 may be necessary. In order to avoid stresses being formed in the arms 4,8 and the mirror housing 2 during displacement of the hinge 13, the upper arm 4 and/or the lower arm 8 can be fitted with an adjustment device 16 for adjusting the length of the upper arm 4 and/or the lower arm 8.

The first end 5 of the upper arm 4 is connected to the mirror housing 2 in an area located essentially midway between an upper and a lower edge 17,18 of the mirror housing 2, and the first end 9 of the lower arm 8 is connected to the mirror housing 2 at the lower edge 18 of the mirror housing 2.

In order to facilitate the turning of the rear-view mirror 1 towards the door 7 each of the upper arm 4 and lower 8 arm comprises a joint 19,20.

In order to avoid slits and gaps in the rear-view mirror 1, the upper arm 4, the lower arm 8 and the mirror housing 2 are produced as a single item. Wind noise and squeaking sounds, which can arise due to such slits and gaps, are thereby minimized. The rear-view mirror 1 can be equipped with electrically heated mirror glass 3 and electrical adjustment for orientating the mirror glass 3. By making the upper arm 4 and/or lower arm 8 hollow, cables for power supply for electrical heating and mirror adjustment can be arranged inside the upper arm 4 and/or lower arm 8.

The mirror housing 2 and the lower and upper arm 4,8 are preferably produced in plastic and/or aluminium.

What is claimed is:

1. Rear-view mirror for a vehicle, comprising a mirror housing (2) in which at least one mirror glass (3) is arranged and an upper arm (4), a first end (5) of which is connected to the mirror housing (2) and a second end (6) of which is connected to a door (7) of the vehicle, characterized further by a lower arm (8), a first end (9) of which is connected to the mirror housing (2) and a second end (10) of which is connected to the door (7) in an area located below the level at which a lower edge (11) of a side window (12) of the door (7) is located, where the second end (6) of the upper arm (4) is connected to a hinge (13) which connects the door (7) to the bodywork of the vehicle.

2. Rear-view mirror according to claim 1, characterized in that the upper and lower arms (4,8) each comprises a joint (19,20) which facilitates turning of the rear-view mirror (1) towards the door (7).

3. Rear-view mirror according to claim 1, characterized in that the upper arm (4), the lower arm (8) and the mirror housing (2) are produced as a single item.

4. Rear-view mirror according to claim 1, characterized in that at least one cable is arranged inside the upper arm (4) and/or lower arm (8).

5. Rear-view mirror according to claim 1, characterized in that the upper arm (4) and/or lower arm (8) comprise an adjustment device (16) for adjusting the length of the upper arm (4) and/or lower arm (8).

6. Rear-view mirror according to claim 1, characterized in that the first end (5) of the upper arm (4) is connected to the mirror housing (2) in an area essentially located midway between the upper and lower edges (17,18) of the mirror housing (2) and the first end (9) of the lower arm (8) is connected to the mirror housing (2) at the lower edge (18) of the mirror housing (2).

* * * * *